Figure 6:
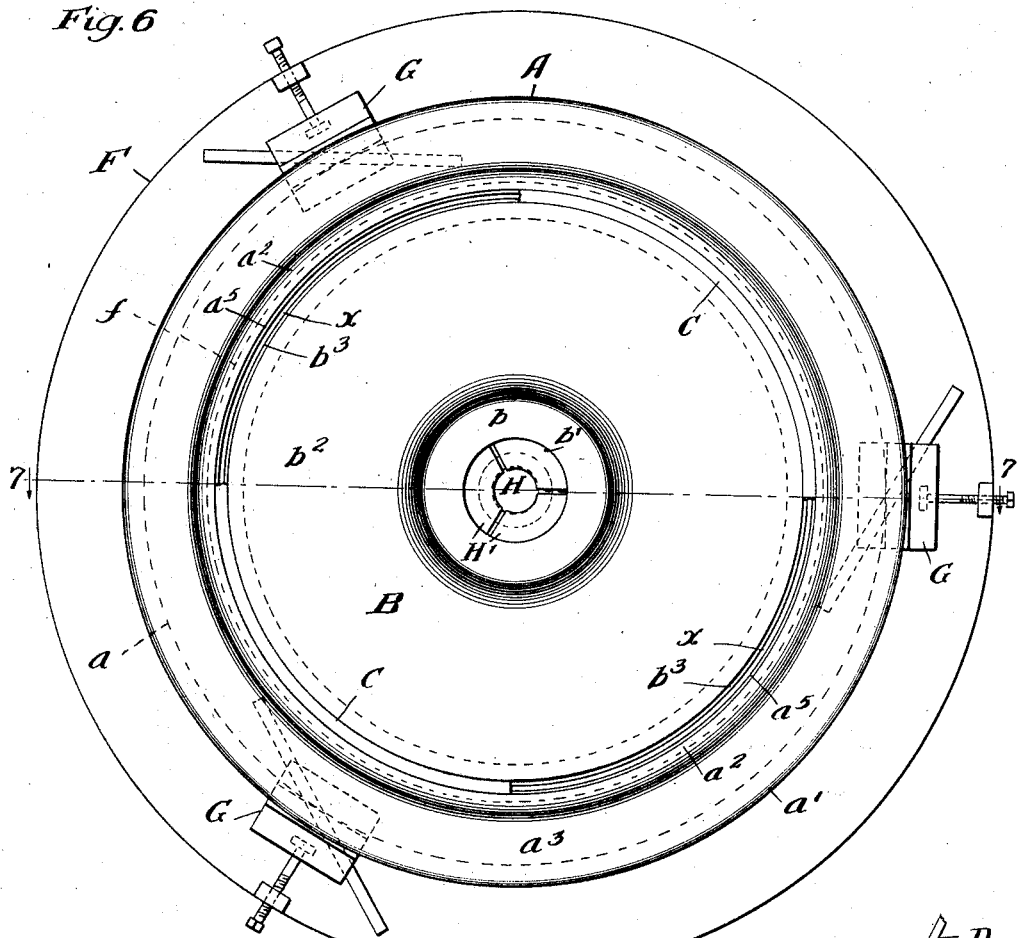

W. L. JACOBY & F. B. BELL.
WHEEL.
APPLICATION FILED MAY 2, 1910.
974,798. Patented Nov. 8, 1910.
3 SHEETS—SHEET 1.
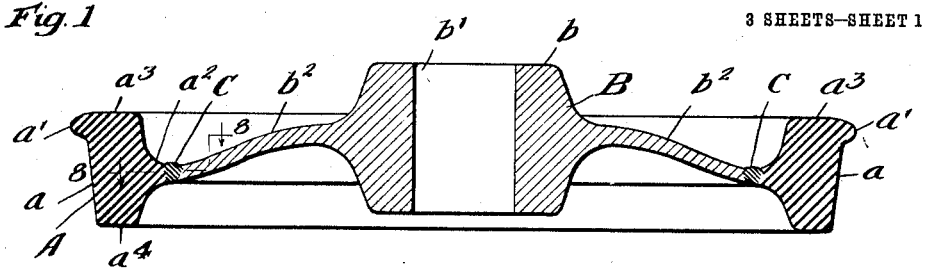
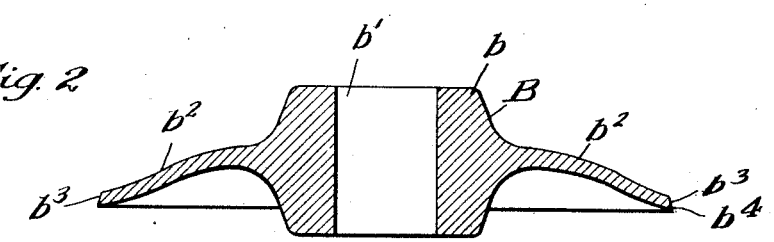
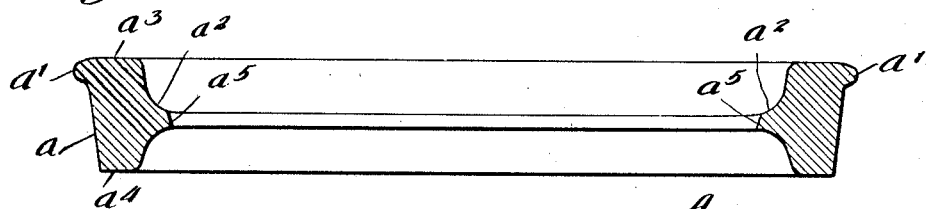
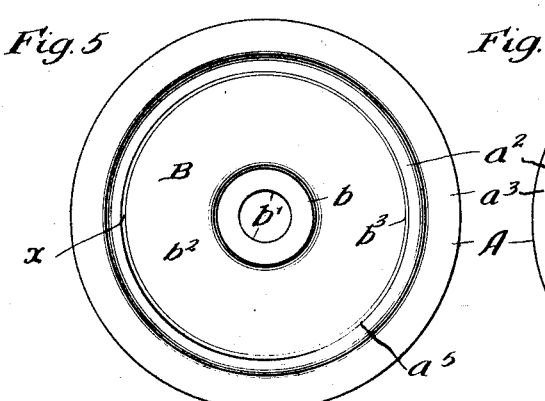
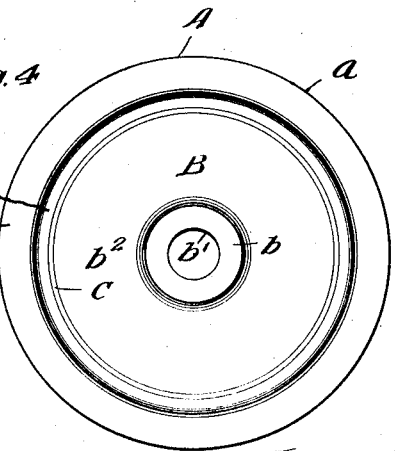
Witnesses:
Wm. Geiger
Inventors:
Frank B. Bell
William L. Jacoby
By Munday, Evarts, Adcock & Clarke
Attorneys

W. L. JACOBY & F. B. BELL.
WHEEL.
APPLICATION FILED MAY 2, 1910.

974,798.

Patented Nov. 8, 1910.
3 SHEETS—SHEET 2.

Witnesses:
Wm. Geiger
H. W. Munday

Inventors:
Frank B. Bell
William L. Jacoby
By Munday, Evarts, Adcock & Clarke.
Attorneys

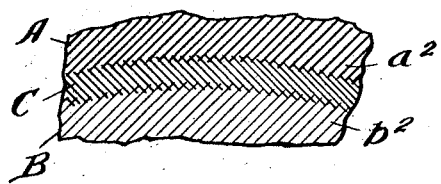
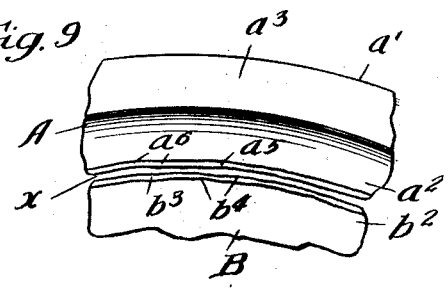
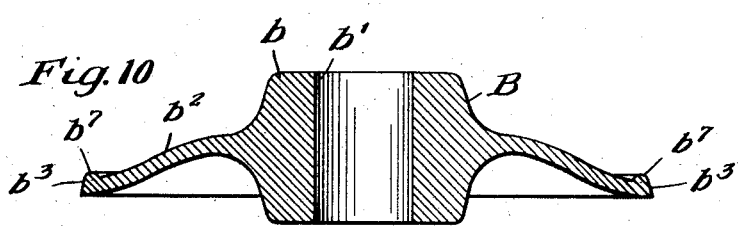
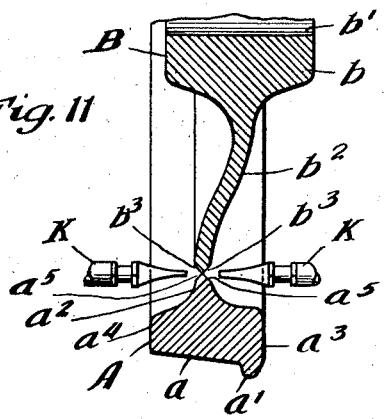

UNITED STATES PATENT OFFICE.

WILLIAM L. JACOBY AND FRANK B. BELL, OF CHICAGO HEIGHTS, ILLINOIS.

WHEEL.

974,798.                Specification of Letters Patent.        Patented Nov. 8, 1910.

Application filed May 2, 1910. Serial No. 558,966.

*To all whom it may concern:*

Be it known that we, WILLIAM L. JACOBY and FRANK B. BELL, citizens of the United States, residing at Chicago Heights, in the county of Cook and State of Illinois, have invented a new and useful Improvement in Wheels, of which the following is a specification.

This invention relates to improvements in wheels and process of manufacturing same, and more particularly to wheels having rolled steel tires and metallic centers or bodies of a different structure or composition, such as cast or forged steel or iron.

Heretofore in the manufacture of car and other vehicle wheels having rolled tires and centers of cast or other metal, the centers are usually furnished with an integral rim approximating in width the width of the rolled steel tire and the periphery of the center and the interior periphery of the tire are very accurately turned, and then the tire is heated and shrunk upon the center to rigidly secure the two parts together. To further secure the parts together, the peripheral meeting faces of the tire and center are frequently furnished with interfitting annular grooves or flanges, through which bolts are passed parallel to the axis of the wheel; and sometimes the side faces of the tire and rim of the center are furnished with annular grooves to receive flanged retaining rings on one or both sides of the wheel through which bolts or rivets are passed as a further means for securing the tire on the wheel center. This construction of rolled steel tire-wheels is not only expensive to manufacture on account of the wide peripheral faces of the tire and rim of the center requiring to be accurately machined to an exceedingly tight fit, and the numerous bolt or rivet holes to be bored and the provision of bolts or rivets and retaining rings and of annular grooves or flanges on the tire and wheel rim for their reception, and the labor and expense of shrinking the tires on the centers and assembling the other parts; but the wheel itself so produced is not of the most reliable or satisfactory character, especially after the rolled steel tire becomes worn comparatively thin or heated under the application of the brakes, so as to somewhat loosen its shrinkage fit on the center and thus cause or permit a destructive shearing strain on the connecting bolts or rivets. And in such wheels, the life or durability of the wheel is also out of all proportion to the combined radial thickness of the rim of the center and of the rolled steel tire as the wheel is no longer safe for use after the tire itself has been so reduced in radial thickness by wear that it is liable to fracture, as the rim of the center gives no additional strength to the tire against bursting, but is rather an element of weakness to the tire, owing to the tension it exerts thereon by reason of the shrinking of the one member upon the other. It heretofore has also been proposed to manufacture rolled steel tire car wheels with cast steel or iron centers by placing the rolled steel tire in a mold and casting the center therein, relying upon the heat of the molten metal to fusibly unite itself to the interior periphery of the rolled steel tire. But the wheels produced by this process have not proven very reliable, satisfactory or durable, as the high heat to which the rolled steel tire is subjected by this process tends to change the physical structure of the metal in the rolled steel tire and to very greatly diminish the durability and wearing qualities of the rolled steel tire, due to the work done upon it by the rolling operation, and especially by the finishing rolls of the tire rolling mill. And in addition, the molten metal when poured into the rolled steed tire for casting the center is very liable to fuse its way very deeply into or almost entirely through the rolled steel tire at portions of its circumference, especially if the molten metal, when poured into the tire, is a little too hot; while on the other hand, if it is a little too cool, it is liable to form a very imperfect fused union with the rolled tire; and in either case, produce a defective or unsafe wheel. And this process is also attended with a further disadvantage, that the cast iron or steel centers being molded into the tire cannot be separately inspected before being permanently united to the tire and the defective castings thus eliminated before being joined to the comparatively costly rolled steel tire, and to the still further disadvantage, that any annealing operation to which such center is subjected must also be applied to the rolled steel tire to its injury. It heretofore has also been proposed to manufacture rolled steel tire-wheels by casting an intermediate ring between the rolled steel tire and the wide peripheral rim of a separately made cast or forged steel or iron center, both the tire and the center being placed within a mold and the molten metal to form the intermediate ring, being poured into the annular space between the rim of the center and the tire on the supposition that the molten metal of the intermediate ring would fuse itself to both the center and the tire, and thus fusibly unite the same. But this method is obviously open to substantially the same objections as that of casting the whole center within a rolled steel tire, as the intermediate ring of molten metal in contact with the whole interior circumference of the rolled steel tire must necessarily subject the rolled steel tire to a high temperature and thus injure its wearing qualities and durability, and also be liable to fuse its way through or partially through the radial thickness of the tire, and also be liable at portions of the circumference to very imperfectly unite itself to the inner face of the tire. It heretofore has also been proposed to manufacture rolled steel tire-wheels by accurately turning the inner periphery of the rolled steel tire and the outer periphery of the rim of the center and then shrinking the tire on the center and then (instead of securing the parts together by bolts, rivets or retaining rings) electrically or otherwise welding small pieces or masses of metal to the tire and rim of the center at the angle or junction between the two, but this method is open to substantially the same objections in respect to expense of manufacture, and weakness and lack of durability of the wheel produced as applies to wheels wherein the tire is secured to the center by bolts, rivets or retaining rings.

The object of this invention is to provide an improved construction of rolled steel tire wheel having a separately formed metal center of cast, pressed, rolled, forged or stamped steel or iron integrally welded to the tire throughout the entire thickness of the parts at the circular or continuous line of weld or union, and in which neither the separately formed center, nor the separately formed steel tire will have or require any accurately turned or machined faces at their line of junction or welding, in which the slight irregularities of such meeting faces from a true circle will coöperate with the welded joint to prevent any possibility of the tire turning in respect to the center under the greatest torsional strains to which the wheel may be subjected, and in which the strength, hardness and wearing qualities of the rolled steel tire as it comes from the tire rolling mill will be fully preserved or retained and in no way injured or diminished by the process of securing or welding it to the wheel center, and also to provide a process by means of which such improved wheel may be rapidly and cheaply manufactured.

The invention consists in the means employed and herein shown and described for accomplishing this object or result, the same being more particularly specified in the claims.

Figure 7:
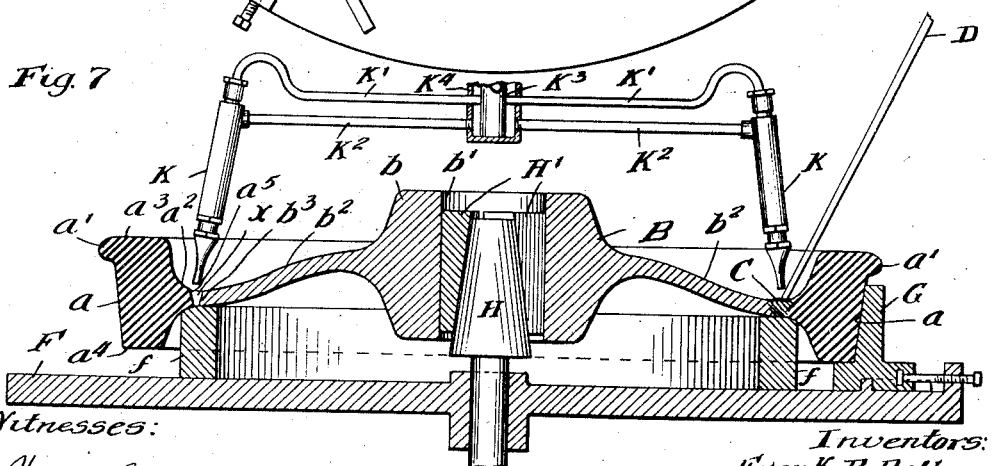

In the accompanying drawing forming a part of this specification, Figure 1 is a central section of a rolled steel tire-wheel embodying the invention. Fig. 2 is a detail section of the wheel center before being assembled within the tire. Fig. 3 is a similar section of the rolled steel tire. Fig. 4 is an elevation of the finished wheel. Fig. 5 is a similar plan view showing the tire and center assembled ready for welding, but prior to the welding operation. Fig. 6 is an enlarged view similar to Fig. 5, showing the tire and center partially welded together, and also showing devices suitable for concentrically centering the tire and center one within the other, and devices suitable for use in welding the tire and center together. Fig. 7 is a section on line 7—7 of Fig. 6. Fig. 8 is an enlarged detail horizontal section on line 8—8 of Fig. 1. Fig. 9 is an enlarged diagrammatic or illustrative view, showing a short arc of the peripheral meeting faces of the tire and center prior to welding. Fig. 10 represents a modified construction of the wheel center. Fig. 11 is a sectional view, similar to Fig. 6, but representing the tire and wheel being welded together while held in an upright position, and the progressive heating and welding operation being done from opposite sides of the wheel.

In the drawing, A represents a rolled steel tire as it comes from the tire rolling mill, the same having the customary tread $a$ and flange $a^1$. It is furnished on its inner periphery with an inwardly projecting thin narrow annular flange or web $a^2$ between the inner and outer faces $a^3$ $a^4$ of the tire.

B is the wheel center or body, having the usual hub portion $b$ furnished with a bore $b^1$ to receive the axle, and a relatively thin plate or web portion $b^2$. The center of the wheel may be of any suitable metal, as of iron or steel, and formed in any suitable way, as by casting, forging, rolling, stamping or otherwise. It is preferably, however, formed in one integral piece and of cast steel, and suitably annealed.

C represents a continuous or annular weld film uniting the thin inner annular flange of the rolled steel tire to the web of the wheel center at the meeting faces or edges of said parts and filling the irregular small annular crevice $x$ between the tire and rim. This weld annulus C has a different composition from both the tire A and center B, being in part a mixture of both the tire metal and center metal, and preferably in part a mixture therewith of vanadium steel or other metal composing the weld rod D employed in the welding operation. The continuous weld film C extends through the entire thickness of the inner flange $a^2$ of the tire and web $b^2$ of the wheel center at their line of junction or union. And this weld annulus may be heaped or walled up slightly on one or both faces of the wheel so as to give the wheel web greater strength at the weld line than elsewhere as a matter of additional security.

The tire A has a true circular tread $a$, the same being, as customary, exteriorly centered in the tire rolling operation or mill. The inner face $a^5$ of its inner flange or web $a^2$ is preferably left with the same irregularities or variations $a^6$ from a true circle as are naturally produced by the tire rolling operation or mill, and the inner face of this web $a^2$ is preferably not trued up or machined in any way preparatory to the welding operation.

The outer peripheral face or edge $b^3$ of the web $b^2$ of the center B is also preferably left with such peripheral irregularities $b^4$ as it may naturally have from the casting, forging, stamping or other operation by which this center is formed, so that the small annular crevice $x$ between the peripheral face $b^3$ of the wheel center and $a^5$ of the tire flange will be of varying extent radially at different points of the circumference.

The exterior peripheral face $b^3$ of the wheel center B is made slightly smaller than the interior peripheral face $a^5$ of the wheel flange $a^2$ so that when the tire is externally centered by centering devices engaging its true circular tread, the center B may also be accurately internally centered concentric with the circular tread of the tire by internal centering devices engaging the hub of the center on the inside or outside thereof, according as the hub has been already bored or not.

In order to securely and perfectly weld the rolled steel tire A and separately formed wheel center B together at the more or less irregular or eccentric meeting peripheral faces $a^5$ and $b^3$ of their relatively thin webs $a^2$ $b^2$ without materially heating or in any way injuring the rolled steel tire or diminishing its hardness, strength, toughness or wearing qualities, the tire A and center B are first assembled and accurately centered in respect to each other, the one exteriorly or from its true circular tread and the other interiorly or from its hub to bring the tread of the tire exactly concentric with the hub or the axle-bore thereof with a narrow annular crevice $x$ of varying width between their irregular or non-concentric meeting faces $a^5$ $a^3$; and then, while the parts are maintained in this position with the webs $a^2$ $b^2$ in the same plane, narrow zones thereof directly adjacent to said crevice $x$ are, point by point, or progressively along the circumference of said faces, subjected to the heat and force of a concentrated and intensely hot and powerful flame, preferably an oxygen-acetylene flame, and progressively heated and progressively fused and progressively welded together, the force and intense heat of the flame blast from the oxygen-acetylene torch acting to momentarily heat the small portions or areas against which it is momentarily directed to the welding and fusing degree, and to fuse and intermingle or flow together small portions of the metal of the tire and of the center from each side of the dividing crevice $x$ and to fill or wall up said crevice and form a perfect weld, point by point, or progressively along the line of the crevice, as the flame is caused to traverse said line by moving the wheel or torch, the one in respect to the other. To prevent any thinning of the web of the finished wheel along the annular line of the weld by the fusing and flowing together of the metal required to fill and wall up the dividing annular crevice $x$ between the tire and center, it is preferred to supply extra welding metal from a welding rod as D, the end of which is from time to time held in the flame of the torch, so that the metal fused therefrom intermixes with that fused from the walls of the crevice $x$, thus giving the weld annulus C a mixed composition of all three metals, that of the tire A, center B and welding rod D.

The welding rod D may be of any suitable metal, as soft iron for example, but is preferably of vanadium steel or other alloy adapted to give great strength and tenacity to the weld annulus C.

If preferred, as shown in Fig. 10, the wheel center B may be cast or otherwise formed with a thickened portion or annular rib $b^7$ directly adjacent its peripheral face $b^3$, and the fusing of this rib or thickened portion by the flame from the oxygen-acetylene torch will supply the necessary extra metal to form the weld C and fill the crevice $x$ and give the weld an additional thickness over that of the adjacent webs $a^2$ $b^2$. This may be used in place of or in addition to the welding rod D.

Any suitable means may be employed for concentrically centering and supporting the tire and wheel center during the progressive welding operation, and the welding operation may be performed with one or with several torches held and moved by hand or any suitable means may be employed for imparting a relative movement to either the wheel or torch. To enable the invention to be more readily understood, a means suitable for this purpose is illustrated in the drawing. The same preferably comprises a turn table F, a tire centering ring or device G adapted to engage the circular tread of the tire and thus exteriorly center the tire, and a wheel center centering device H H¹ adapted to engage the hub of the wheel center either interiorly or exteriorly, and preferably consisting of a cone member H and a segmental chuck member H¹. The turn table is also preferably furnished with supports $f$ adapted to engage the tire and wheel center webs $a^2$ $b^2$ adjacent to the dividing crevice $x$ between their meeting peripheral faces.

K K represent oxygen-acetylene torches, each having an oxygen supply pipe K¹ and an acetylene gas supply pipe K² connected with the main supply pipes K³ K⁴. The tire A and wheel center B may be centered and supported in any suitable position during the progressive welding operation. In Fig. 6 the same are represented as being supported in a horizontal position. In Fig. 11, they are represented as being supported in an upright position during the welding operation and in said Fig. 11, the progressive heating and welding operations are illustrated as being performed from opposite faces or sides of the wheel. As the heating, fusing and welding operation is performed progressively or point by point along the circular line of junction between the tire and wheel center, and as only a very small area or portion of the relatively thin webs of the tire and wheel center undergoes the heating, fusing and welding operation at a time, it is obvious that the tread and main body of the rolled steel tire is never at any time materially or injuriously heated at any portion of its circumference, or heated to such an extent as to in any way injure its wearing qualities or diminish its strength and hardness due to the work done upon it in the rolling operation.

In practicing the invention, the tire and wheel center are preferably assembled and centered one within the other while both retain the initial heat incident to the final steps of their separate manufacture, that is to say, the rolled steel tire is taken freshly from the tire rolling mill by which it is produced and with the initial heat remaining therein at the final or finishing step of the rolling operation, and the wheel center with the initial heat left therein as it comes from the annealing or finishing step of its manufacture. The initial heat thus remaining in the tire and wheel center materially facilitates the progressive welding of the two members together and to some extent diminishes the amount of acetylene gas and oxygen or other gaseous flame employed in the progressive welding operation.

In practicing the invention, the wheel centers B, instead of being specially cast, may be cut or bored from worn out wheels having either solid or rolled steel tires, the treads of which have become so worn as to be unfit for further use, thus utilizing the centers of an old or worn out wheel to form a new wheel by progressively welding a new rolled steel tire A to the web of the old wheel.

In practicing the invention, the rolled steel tire A may be and preferably is of a high grade alloy steel, such as nickel chrome steel or chrome vanadium steel or vanadium steel or manganese steel, thus giving great durability to the wheel as an entirety, while the wheel center may be made of ordinary carbon steel or cast iron or other like material of relatively small cost, so that the cost of the wheel as a whole will not be great or excessive, although having its tire portion composed of relatively costly and exceedingly durable material, and specially adapted for the service to which a car wheel is subjected.

We do not herein claim the process by which our improved wheel is produced, but reserve the same for the subject of a divisional application hereafter to be filed.

We claim:—

1. A wheel comprising a rolled steel tire having an integrally formed and relatively thin, narrow inner annular web and a separately formed center having a hub and a relatively thin web of smaller exterior periphery than the interior periphery of said tire web, and welded thereto with a narrow weld annulus of varying width radially at different points of the circumference, substantially as specified.

2. A wheel comprising a rolled steel tire having an integrally formed and relatively thin and narrow inner annular web and a separately formed center having a hub and a relatively thin web of smaller exterior periphery than the interior periphery of said tire web and welded thereto with a narrow weld annulus of different composition from either said tire or said center and extending through the entire thickness of said webs, substantially as specified.

3. A wheel comprising a rolled steel tire having an integrally formed and relatively thin, narrow inner annular web and a separately formed center having a hub and a relatively thin web of smaller exterior periphery than the interior periphery of said tire web, and welded thereto with a narrow weld annulus of varying width radially at different points of the circumference and extending through the entire thickness of said webs, substantially as specified.

4. A wheel comprising a rolled steel tire having an integrally formed and relatively thin, narrow inner annular web and a separately formed center having a hub and a relatively thin web of smaller exterior periphery than the interior periphery of said tire web and welded thereto with a narrow weld annulus of different composition from either said tire or said center and containing an admixture of vanadium steel, and extending through the entire thickness of said webs, substantially as specified.

5. A wheel comprising a rolled steel tire having an integrally formed and relatively thin, narrow inner annular web and a separately formed center having a hub and a relatively thin web of smaller exterior periphery than the interior periphery of said tire web, and welded thereto with a narrow weld annulus of varying width radially at different points of the circumference and extending through the entire thickness of said webs, and containing an admixture of alloy steel, substantially as specified.

6. A wheel comprising a rolled steel tire having an integrally formed and relatively thin, narrow, annular web and a separately formed center having a hub and a relatively thin web of smaller exterior periphery than the interior periphery of said tire web, and welded thereto with a narrow weld annulus of varying width radially at different points of the circumference, and containing an admixture of vanadium steel, substantially as specified.

7. A wheel comprising a separately formed tire having an integral and relatively thin inner annular web and a separately formed center having a hub and a relatively thin web, said webs being integrally united and welded together at their peripheries and having a weld annulus of metal fused from said center intermixed with metal fused from said tire, and with metal fused from an extraneous welding metal, substantially as specified.

8. A wheel comprising a rolled steel tire having an integrally formed and relatively thin inner annular web and a separately formed center having a hub and a relatively thin web, and a weld annulus integrally uniting said webs of the tire and center and composed of an admixture fused and flowed together from both tire and center and from an extraneous welding metal, substantially as specified.

WILLIAM L. JACOBY.
FRANK B. BELL.

Witnesses:
PEARL ABRAMS,
H. M. MUNDAY.